United States Patent [19]

Melead

[11] 3,877,857
[45] Apr. 15, 1975

[54] MULTIPLE MELT CHAMBER EXTRUSION DIE

[75] Inventor: James J. Melead, Roscoe, Ill.
[73] Assignee: Beloit Corporation, Beloit, Wis.
[22] Filed: Dec. 20, 1972
[21] Appl. No.: 316,863

[52] U.S. Cl. ............ 425/133.5; 425/381; 425/463; 425/466
[51] Int. Cl. .............................................. B29d 7/04
[58] Field of Search .......... 425/381, 131, 382, 440, 425/466, 467, 463, 378; 156/500

[56] References Cited
UNITED STATES PATENTS

| | | | |
|---|---|---|---|
| 3,315,306 | 4/1967 | Ladner | 425/463 X |
| 3,357,051 | 12/1967 | Zolotarevsky | 425/464 |
| 3,583,032 | 6/1971 | Stafford | 425/109 |
| 3,694,119 | 9/1972 | Scheibling | 425/381 X |
| 3,797,987 | 3/1974 | Marion | 425/466 X |

*Primary Examiner*—Robert D. Baldwin
*Assistant Examiner*—Mark Rosenbaum
*Attorney, Agent, or Firm*—Hill, Gross, Simpson, Van Santen, Steadman, Chiara & Simpson

[57] ABSTRACT

Extrusion die for the extrusion and coextrusion of the plastic materials in which the die body is split and engages opposite sides of a center divider forming a die in which the thermoplastic materials can combine inside and outside of the die in accordance with the characteristics of the plastic materials in a fluid state in the individual melt chambers. The die has interchangeable lips and dividers to effect a combination of the melt streams in the die before exiting, or as they exit from the die, or after they have passed from the die to the atmosphere.

9 Claims, 5 Drawing Figures

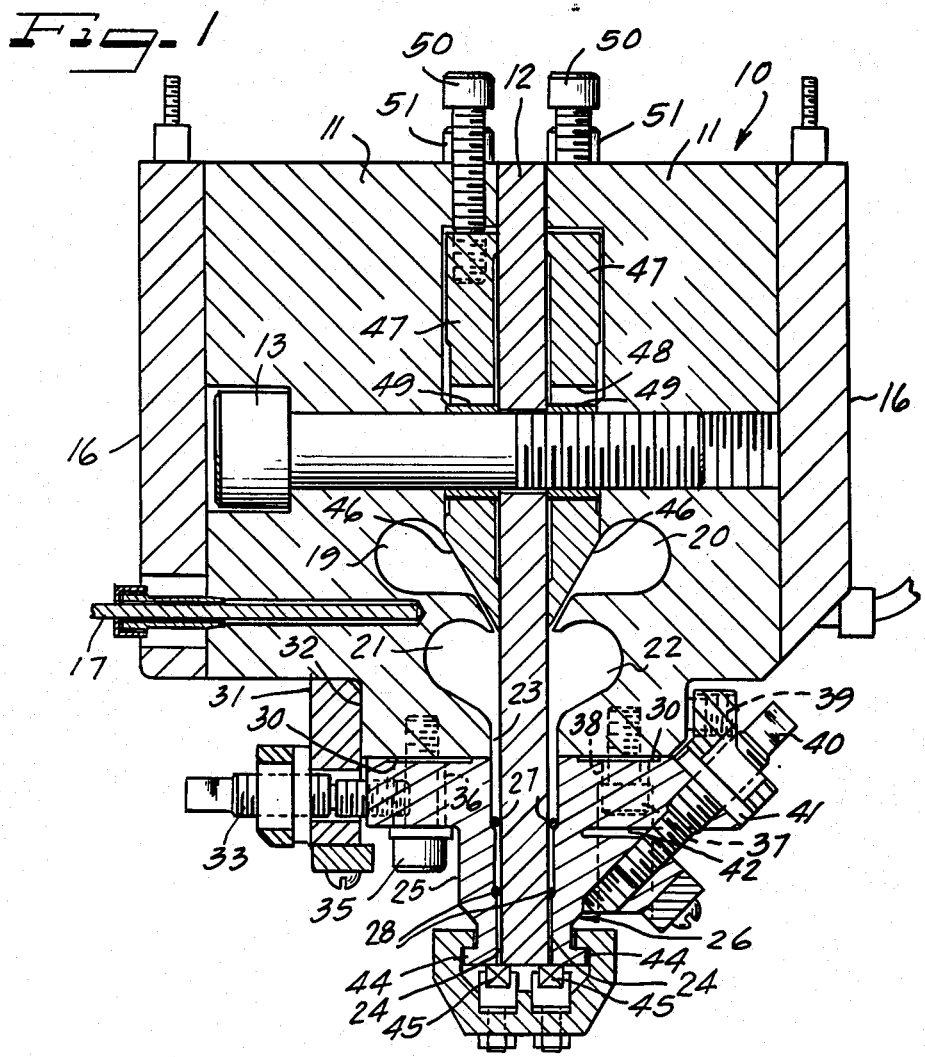

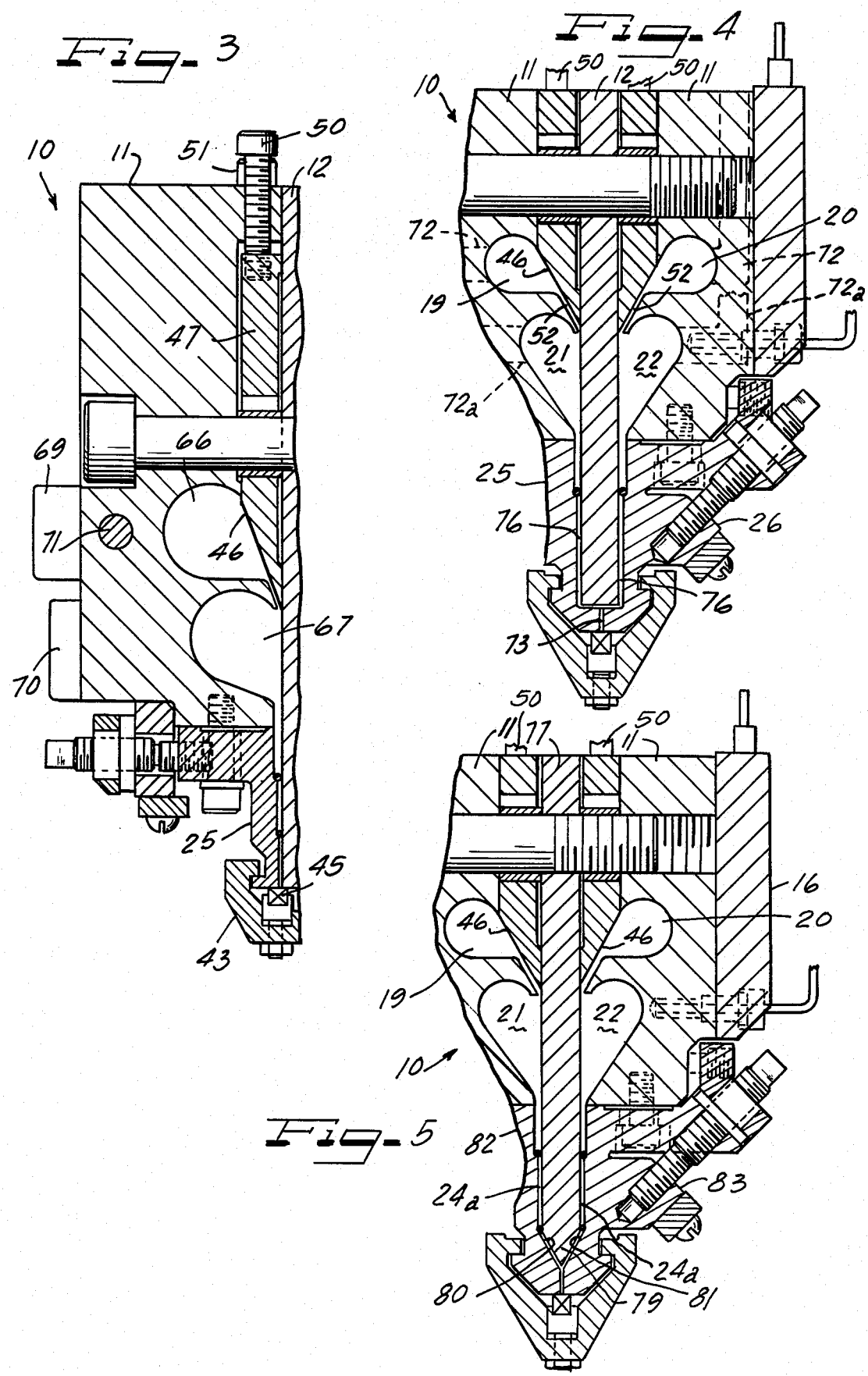

MULTIPLE MELT CHAMBER EXTRUSION DIE

FIELD OF THE INVENTION

Multi-manifold film extrusion die for producing multi-layer laminates, and of the type found in Class 425.

BACKGROUND, SUMMARY AND ADVANTAGES OF INVENTION

Dies for extruding multi-layer composite plastic film are shown in the U.S. Pat. Nos. to Stafford 3,583,032, the U.S. Pat. No. to Scheibling 3,694,119, the U.S. Patent No. to Koch 3,464,087 and in George J. Marion applications Ser. Nos. 223,435 and 223,436 filed on Feb. 4, 1972 as continuations-in-part of application Ser. No. 861,047 filed Sept. 25, 1969, and licensed under an exclusive license to the assignee of the present invention.

While these patents and applications show coextrusion dies which may cast multi-layer composite plastic film, they do not take into consideration the differences in viscosities and rheologies of the materials extruded and the fact that materials of similar viscosities and rheologies at essentially the same temperatures bond better when combined inside than outside of the die, while other materials of different viscosities and rheologies cannot be efficiently combined inside of the die and combine better when leaving the die prior to reaching the atmosphere or when entirely outside of the die.

The die of the present invention has at least three melt chambers from which plastic film may be extruded and may be so arranged that the plastic films may be combined inside or outisde of the die in accordance with the viscosities and rheologies of the plastic materials being extruded, and in which the slots leading from the melt chambers may be individually adjusted for gauge control, to permit the use of a plurality of different resins which may or may not have the same rheological characteristics.

Thus, each plastic layer can be individually controlled, manifolded, and adjusted to gauge prior to joining with the other layers internally of the die and these layers can further be controlled and adjusted for gauge and joined externally or quasi-externally of the die as dictated by product requirements.

The die further is shown as being a split die as in my application Ser. No. 299,044 filed on Oct. 19, 1972, to reduce the cost of machining the die and make the die more versatile and to readily change the configuration of the die by the use of a minimum number of die parts.

The die of the present invention may be divided by a center divider providing multiple die channels which may be formed to combine composite films either internally of the die or to accommodate the combining of the films externally of the die or both internally and externally of the die to enable the combination of thermoplastic materials having the same rheology inside of the die with those having different rheologies or characteristics, outside of the die, or just prior to the exit of the film to the atmosphere.

Among the advantages of the present invention are that three, four or more different materials having the same or different rheologies may be combined by preselecting the region of combination of the materials in accordance with the characteristics and temperatures of the materials extruded.

A further advantage of the invention is that by providing a split die with a plurality of manifold chambers, and spacing the body parts of the die by a central divider, the exits from the manifold chambers may be controlled along opposite sides of the divider and varied in accordance with the material in the manifold chambers, while the divider itself, in cooperation with the die lips, may form dual exit slots which may be varied in accordance with the thickness of the final film, or a single exit slot.

A further advantage of the invention is the construction and arrangement of the die to attain an infinite number of combinations of thermoplastic materials and the production of more uniform and ideal thermoplastic films.

A further advantage of the invention is that each layer of thermoplastic film can be individually controlled, manifolded, and adjusted for gauge, prior to joining with other layers internally, externally or just prior to extrusion of the layers from the die.

Other objects, features and advantages of the invention will be readily apparent from the following description of several preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a transverse sectional view taken through a form of dual slot extrusion die constructed in accordance with the principles of the present invention.

FIG. 2 is an end view of the die shown in FIG. 1, illustrating inlet die plugs for each melt chamber supplying each melt chamber with a multi-layer film.

FIG. 3 is a transverse sectional view taken through a modified form of die from that shown in FIG. 1 in which individual heating elements are provided for the separate melt chambers and one half of the die is shown in section.

FIG. 4 is a partial fragmentary transverse sectional view taken through a form of multi-melt chamber die in which the die lips form a single discharge element to combine the films prior to reaching the atmosphere; and FIG. 5 is a fragmentary transverse sectional view of a multi-melt chamber die similar to that shown in FIG. 4 in which the divider between the die halves is tapered to converge the films on opposite sides of the divider to a central discharge orifice or exit slot.

DESCRIPTION OF PREFERRED EMBODIMENTS OF THE INVENTION

In FIG. 1 of the drawings, I have shown a multi-melt chamber split body die 10 including two die halves 11 divided by a center spacer strip 12, and secured together into a single die body as by cap screws 13 recessed in said body and spaced therealong. Each die half 11 is of a similar construction and, except for the die chamber arrangement, is similar to the dual slot die shown and described in my prior application Ser. No. 299,044 entitled "Interchangeable Die Lips for Extrusion Die and Independently Adjustable Deckles Therefor." The die further is shown as being an end inlet die while that of my prior application is a top inlet die, although the die need not necessarily be an end inlet die, but may be a center or side inlet die dependent upon the plastic materials to be extruded. Heaters 16, which may be resistor heaters of a conventional form, are spaced along the outer side of each die half and are controlled by thermocouples 17 spaced along the die halves at intervals to maintain the temperature of the die body at a selected temperature, and to thereby maintain the thermoplastic material in melt or manifold chambers 19,20,21 and 22 in the proper melt flow state in said chambers.

The melt chambers 19 and 20 are shown as being spaced above the melt chambers 21 and 22 and as positioned at opposite sides of the center divider plate 12 and opening to said plate. Said divider plate with said melt chambers 21 and 22, form melt flow passageways 23 leading from said last-mentioned melt chambers. Said melt flow passageways are formed by the inner walls of adjustable die lips 25 and 26 extending along opposite sides of said center divider in cooperation with the walls of said divider. The walls of the die lips facing the divider are stepped toward reduced width exit slots 24 and the stepped portions thereof provide shoulders for internal deckles 27 and 28, as in application Ser. No. 299,044.

The die lips 25 and 26 are shown as being similar to the die lips 22 and 23 in aforementioned application Ser. No. 299,044. The die lip 25 is shown as being a slide die lip carried on a mounting bar 31 secured to a shouldered portion 32 of one die half 11 as by a differential adjustment screw 33, operable to move said die lip along retaining machine screws 35 spaced along and threaded in the die half 11 from the bottom thereof. The machine screws 35 extend through slots 36 in the die lip to accommodate adjustable movement of said die lip, and may be tightened when the die lip is in the proper position for the thickness of film to be delivered through the exit slot or orifice 24. It should be understood that differential screws 33 and adjustment screws 35 are spaced along the die half to provide uniform adjustment of the die lip throughout its entire length and that slidable die lips 25 may be spaced on each side of the divider plate 12, and may be interchanged with the flexible die lips 26 which may be on either side of the divider plate 12, to provide either a flexible and slidable die lip or two slidable die lips or flexible die lips in accordance with the thermoplastic material extruded through the exit slots 24 on each side of the divider plate 12.

The flexible die lip 26, like that shown in application Ser. No. 299,044, is retained to the bottom wall 30 of the die half 11 as by machine screws 37 extending through slots 38 in said die lip and threaded in the bottom 30 of the die half 11. Said die lip is moved in and out relative to the divider plate 12 as by push screws 39 and pull screws (not shown) spaced along the die half for substantially the length thereof. Differential screws 40 are threaded in T-nuts 41 and serve to flex the die lip toward and from the divider plate 12 about a slotted portion 42 thereof, in a manner like that shown in my aforementioned application Ser. No. 299,044.

The die lips 25 and 26 slidably support a deckle boat 43 at each end of the die, on outwardly projecting gibs 44 extending for the length of the die lips. Each deckle boat carries deckle seals 45 varying the length of the exit slots 24 in accordance with the width of the sheets extruded through said exit slots. The deckle boats may be moved along the gibs 44 as by rack and pinion means or worm and worm gear means as in my aforementioned prior application and form no part of the present invention so need not herein be shown or described further.

The internal deckles 27,27 and 28,28 are adjustably movable inwardly and outwardly relative to the die lips to disrupt the edge of the molten plastic as an aid to avoid beading of the edges of the film, and may be of various suitable forms in accordance with the type of plastic material and films passing through the exit slots 24.

The respective manifold chambers 19,20,21 and 22 are shown as being aligned on opposite sides of the divider plate 12 when the die is assembled and when taken together, may be of a generally heart-shaped formation, tapering at their lower ends toward the divider plate 12. As shown in FIG. 1, the manifold chambers 21 and 22 taper to the melt flow passageways 23 while the manifold chambers 19 and 20 cooperate with inclined lips 46 of gap control members 47, slidably supported in each die half 11 along opposite sides of the divider plate 12, to adjust the gaps to exit passageways leading from said chambers 19 and 20. The adjustable gap control members 47 are each shown as having a slot 48 intermediate its ends. The slots 48 extend along opposite sides of bearing members 49 on the machine screws 13 retaining the die halves 11 in assembled relation with respect to each other.

A series of push screws 50 are spaced along the die halves 11 and threaded therein and have engagement with the tops of the gap control members for moving the lips 46 to narrow gaps or discharge slots 52 leading from the chambers 19 and 20. Between the push screws 50 and in alignment therewith are a series of pull screws 51 freely rotatable in the die halves 11 and threaded in the gap adjustment members 47 to move the gap control members to widen the gaps or exit slots from the chambers 19 and 20. The push screws 50 and pull screws 51 may cooperate with each other to obtain a fine adjustment of each gap 52.

Die plugs 57,58,59 and 60 at the end of the die body form hot melt inlets to the melt chambers 19,20,21 and 22, respectively. The die plugs 57 to 60 are each of a similar construction and are like those shown in FIGS. 4 and 6 of U.S. Pat. No. 3,583,032 which issued to L. O. Stafford on June 8, 1971 and form no part of the present invention except insofar as they provide an end feed for each melt chamber in which more than one form of plastic material may be supplied to each melt chamber and combined, and in which the die plugs may be changed for various ratios or percentages of plastic material. As for example, the structure of U.S. Pat. No. 3,583,032 may have a die plug for a two-layer film where the ratio of 10% of one material and 90% of a second material or the plug may supply a three-layer film where each layer may be the same or may be of different percentages. Also, with such die plugs, a thin plastic material may be joined inside the die for structural purposes and the thin member may be extruded with the structural member from one slot and combined with the thin member and structural member from the other slot outside the die.

As shown in FIG. 2, the die plugs 57,58,59 and 60 are each of a similar construction, and are suitably mounted in a separate block 61 bolted or otherwise secured to an end plate 63 for the two die halves 11. The die plugs 57,58,59 and 60 each have communication with an individual inlet chamber 62, which chambers may extend into the die halves 11, and extend within the associated inlet chamber in the manner shown in U.S. Pat. No. 3,583,032, to supply one, two or three layers of plastic material to the inlet end of an associated melt chamber 19, and force the plastic material therealong as displaced by plastic entering the die block through inlets 64 and 64a. The plastic material is supplied through the inlets 64 and 64a by means of extruder screws or other appropriate plastic supply means. As diagrammatically shown in FIG. 2, the die plug 57 has a pair of vanes 65 in the inlet chamber 62 converging in the form of a V and terminating into an apex extending along the center of the inlet passageway 64. The space between the vanes 65 is centered relative to the inlet passageway 64a entering the die block from the top thereof as in U.S. Pat. No. 3,583,032. Hot melt plastic material entering the die block through the inlet passageway 64 along the apex of the vanes 65 is thus divided into two films or layers and sandwiches hot melt plastic material entering the die block through the inlet 64a and the plastic material in its sandwiched form is forced along the melt chamber 19 to the end thereof and extruded through the slot between an inclined lower wall of the melt chamber and the lip 46 of the gap adjustment member 47. In a similar manner, hot melt plastic material is forced through the respective die plugs 58,59 and 60 and extruded in the form of film and through the exit slots 24 to be joined on the outside of the die. The die plugs 57,58,59 and 60 thus have the ability to join a thin member inside of the die for structural purposes and then extrude the thin member with the structural member from one slot and combine it with a thin member and structural member from the other slot outside of the die.

It should here be understood that where it is desired to extrude only one plastic material through the melt chambers, the material may be delivered to the melt chambers through the inlets 64a, and that by forming a seal between the apex of the V-shaped vanes and the inlet chamber 62, and suitably arranging the inlets 64, to provide a third inlet, three different forms of plastic materials may be extruded into each melt chamber 19,20,21 and 22. Said third inlet is not herein shown since it may be one of a number of inlet arrangements and since the die heads and die blocks are no part of the present invention.

It may thus be seen that by the use of the die plugs 57 to 60 inclusive, as many as twelve laminations of plastic materials may be extruded through the melt chambers 19 to 22 inclusive and joined inside of the die as passing through the die slots or outside the die depending upon the type of material extruded, and that the laminations in each chamber may be of one form of plastic material sandwiched between two other forms of plastic materials with one of the materials serving as a structural member and combined with a thin member either as extruded through the die plugs or as exiting from the die or from the exit slots within the die lips.

In FIG. 3 of the drawings, I have shown a half of a die of the dual slot type similar to that shown in FIG. 1, but have shown melt chambers 66 and 67 of an enlarged cross sectional area from the corresponding chambers 19 and 21 to place the walls of the melt chambers close to the outer walls of the die halves to enable the chambers to be heated individually, by heater banks 69 and 70 extending along the outside of the die half in alignment with the two chambers 66 and 67 to provide separate melt control to the chambers 66 and 67. Similar melt chambers on the opposite side of the die may also be heated by similar heater banks to enable the heat of each individual chamber to be individually controlled where required for certain plastic materials.

I have also shown a heating rod 71 extending along the die half adjacent the melt chamber 66 which may be used with or without the heater banks 69 dependent upon the particular plastic material being extruded. The heater rod 71 need not necessarily be used and is only used where higher temperature of the melt chamber than that attained by the heater bank 69 is necessary. It should, of course, be understood that the heater banks and rods need not necessarily be arranged as shown, but the arrangement thereof may be varied to attain the required temperatures in the melt chambers 66 and 67, for bonding certain plastic materials within the die along the divider 12 or outside of the die with the laminated plastic materials exiting from the hot melt chambers 66 and 67 on the opposite side of the die from the divider 12.

In FIG. 4 of the drawings, I have shown a lip package forming a single exit slot 73 as an alternate form of exit slot from the dual slots 24 shown in FIGS. 1 and 3. In this form of the invention, the composite film from slots 52 leading from the melt chambers 19 and 20 on opposite sides of the divider 12 will be on the inside of the plastic material exiting from the melt chambers 21 and 22 and combined in the exit slot 73 just prior to reaching the atmosphere or as they reach the atmosphere, depending upon the plastic material extruded. Center inlets 72 and 72a lead into the melt chambers 19 and 20 and 21 and 22 respectively, although the inlets need not be center inlets, but may be end inlets as in the form of the invention illustrated in FIG. 1.

The form of lip package of FIG. 4 brings the films closer together before they exit through the die lip and the films may be joined as they pass along the exit slot 73 or may be brought within 0.002 inches of each other and be joined outside of the die. This arrangement substantially increases the ability of combining certain films by bringing them together to be combined just prior to reaching the atmosphere or as soon as they pass through the exit slot, as compared to the spacing of the films as they pass through the exit slots of a dual slot die as in FIGS. 1,2 and 3.

The die of FIG. 5 is similar to that of FIG. 4, except the center divider 12 has been replaced by a center divider 77 having a tapered lower end portion 79, conforming to tapered walls 80 and 81 of die lips 82 and 83 which may be like the die lips shown in FIG. 4 except for the tapered inner walls thereof and may be slidably adjustable toward and from the center divider 77, and may be flex lips or slide lips or a combination of flex and slide lips as shown in FIG. 1 of the drawings. In this form of die lip arrangement, the tapered exit passageways formed by the center divider 77 and inclined walls 80 and 81 of the respective die lips 82 and 83 improve the flow from slots 24a to an exit slot 85 to facilitate the combining of certain films that have heretofore been difficult to combine.

While center divider plates are shown in all forms of the invention, it should be understood that for certain plastic films, the divider plates can be completely removed and the die lips may form a single exit slot for the combining of the films in the chambers 19,20,21 and 22 prior to exiting from the die, or as the films exit from the die depending upon the viscosities, rheologies and temperatures of the films to be combined.

I claim:

1. In a multiple melt chamber film extrusion die,
an elongated die body split along its longitudinal center, and having two die halves,
a center divider extending between said die halves,
at least two melt chambers in said die body extending on each side of said center divider and opening to said divider,
gap control members slidably guided along opposite sides of said center divider and having lips defining the inner walls of the innermost of said melt chambers adjacent said center divider,
means for adjusting said gap control members to define exit passageways leading from said melt chambers of preselected widths in accordance with the thickness of the film to be extruded from said melt chamber, and
die lips adjustably secured to said die body and cooperating with said center divider to define melt flow passageways leading from said melt chambers along each side of said divider, and to provide exit slots for the extrusion of dual films of plastic material.

2. The multiple melt chamber film extrusion die of claim 1, including individual plastic melt inlet passageways leading into said melt flow chambers through the ends thereof.

3. The multiple melt chamber film extrusion die of claim 2, wherein the inlets are in the form of die plugs mounted at one end of said die, each die plug having at least two inlets leading thereinto for the extrusion of different plastic melt materials along said melt chambers.

4. The multiple melt chamber film extrusion die of claim 3, wherein the die plugs have converging vanes cooperating with said inlets to effect the extrusion of at least three layers of plastic material along each melt chamber.

5. The multiple melt chamber film extrusion die of claim 2, including individual plastic melt inlet passageways leading into said melt chambers intermediate the ends thereof.

6. The multiple melt chamber film extrusion die of claim 1, wherein the gap control lips are inclined lips and terminate at said center divider at obtuse angles with respect thereto.

7. The multiple melt chamber film extrusion die of claim 1, wherein the means varying the width of the exit passageways leading from said melt chambers comprise push-pull screws spaced along said die body and having adjustable cooperation with said gap control members for the length thereof.

8. The multiple melt chamber film extrusion die of claim 1, in which the center divider has a tapered lower end portion and the die lips are interchangeable and include die lips having inclined walls formed to converge to a rectilinear exit slot for the joining of a dual film of plastic material immediately upon exiting from the center divider.

9. The multiple melt chamber die of claim 1,
wherein the center divider has a tapered discharge end, and
wherein the die lips are interchangeable and include die lips having tapered walls conforming to said tapered discharge end of said center divider.

* * * * *